United States Patent [19]

Usami et al.

[11] 4,088,849

[45] May 9, 1978

[54] HEADPHONE UNIT INCORPORATING MICROPHONES FOR BINAURAL RECORDING

[75] Inventors: Nobuo Usami; Taira Kato, both of Yokohama, Japan

[73] Assignee: Victot Company of Japan, Limited, Japan

[21] Appl. No.: 725,712

[22] Filed: Sep. 23, 1976

[30] Foreign Application Priority Data

| | | |
|---|---|---|
| Sep. 30, 1975 | Japan | 50-133368[U] |
| Jun. 28, 1976 | Japan | 51-84865[U] |
| Jun. 28, 1976 | Japan | 51-84866[U] |
| Jun. 28, 1976 | Japan | 51-84867[U] |
| Jun. 29, 1976 | Japan | 51-85326[U] |
| Jun. 29, 1976 | Japan | 51-85327[U] |

[51] Int. Cl.[2] .......................... H04M 1/05; H04R 5/00

[52] U.S. Cl. ............................ 179/156 R; 179/182 A; 179/1 G

[58] Field of Search ............................ 179/156 R, 1 G

[56] References Cited

U.S. PATENT DOCUMENTS

| | | | |
|---|---|---|---|
| 2,643,729 | 6/1953 | McCracken | 179/187 X |
| 3,969,583 | 7/1976 | Griese et al. | 179/1 G |
| 4,037,064 | 7/1977 | Yasuda | 179/156 R |

*Primary Examiner*—William C. Cooper

*Attorney, Agent, or Firm*—Robert E. Burns; Emmanuel J. Lobato; Bruce L. Adams

[57] ABSTRACT

A headphone having a pair of microphone-loudspeaker units interconnected by a clamping strap for holding the units against the ears of a wearer. The loudspeaker and a microphone of each unit are isolated acoustically from each other by an enclosure. The enclosure is formed with a generally semicylindrical surfaced portion to simulate the human earlap and a flat surface normal to the semicylindrical surface. The microphone is mounted on the flat surface with its main direction of acoustic sensitivity oriented to a dummy earlap to receive a sound wave reflected therefrom.

12 Claims, 7 Drawing Figures

HEADPHONE UNIT INCORPORATING MICROPHONES FOR BINAURAL RECORDING

BACKGROUND OF THE INVENTION

The present invention relates to a headphone having a pair of units, and particularly to such transducers each comprising a microphone to pick up sound and a loudspeaker acoustically isolated from the microphone to monitor the picked up sound or reproduce pre-recorded sound signals. The invention is particularly suitable for outdoor binaural sound recording.

In conventional binaural sound recording, microphones are each mounted on the corresponding position of the ears of a dummy head to simulate the sound diffraction characteristics of the human head. In outdoor use, however, it is inconvenient for users to hand carry the dummy head because of its bulky size.

SUMMARY OF THE INVENTION

It is an object of the invention to provide a headphone which comprises a pair of units each comprising a microphone to pick up sound and a loudspeaker acoustically isolated from the microphone to minitor the picked up sound or reproduce pre-recorded sound signals.

In accordance with the present invention, there is provided a headphone having a pair of loudspeakers each mounted on a baffle plate and encased within an enclosure, the enclosures is interconnected by a strap for holding the loudspeakers in positions adjacent the ears of a wearer. The invention is characterized in that each of the enclosures is formed with a semicylindrical surfaced portion facing in a direction parallel to the orientation of the head of the wearer to simulate the human earlap in shape and dimensions, a flat surface parallel to the baffle plate and defined by the semicylindrical surface of said portion and the peripheral edge of the enclosure, and a depression in the surface defined by the semicylindrical surface to simulate the human ear canal, and in that adjacent the depression a microphone is mounted on the surface defined by said semicylindrical surface.

Since a microphone and a loudspeaker are incorporated into a single unit, difficulty arises in positioning the microphone with respect to the wearer's ear as close as possible to receive the true sound waves diffracted on the contour of the wearer's face. In accordance with a feature of the invention, the microphone is mounted with its longitudinal axis parallel to the baffle plate and partly embedded into the enclosure and the semicylindrical surfaced portion or dummy earlap is disposed on the lower part of the unit while the loudspeaker is mounted on the upper part of the unit.

A cylindrical depression is provided on a flat surface adjacent the dummy earlap. The microphone is mounted with its main direction of acoustic sensitivity oriented toward the dummy earlap to receive the sound wave that has been reflected from the earlap and propagated through the side and bottom walls of the cylindrical depression.

BRIEF DESCRIPTION OF THE DRAWINGS

The present invention with its various features and advantages will be described by way of example in conjunction with the accompanying drawings, in which.

DESCRIPTION OF THE PREFERRED EMBODIMENTS

Figure 1:
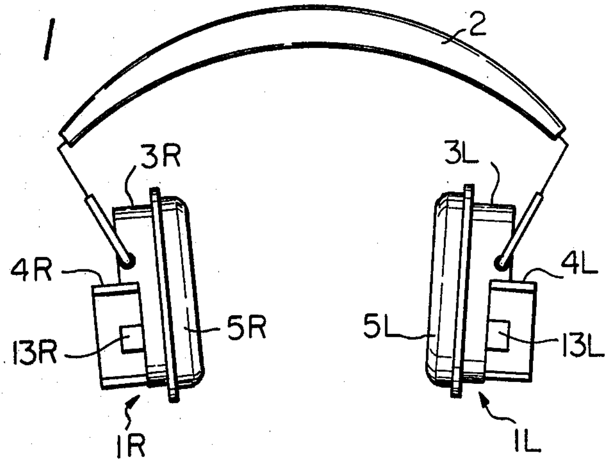
FIG. 1 is a front view of a headphone of the invention.

Referring now to FIG. 1, a binaural headphone-microphone embodying the present invention is shown as comprising a right-ear unit 1R and a left-ear unit 1L interconnected by a clamping strap 2 for holding both units in position against the corresponding ears of a listener. Each unit includes an enclosure 3 formed with an artificial earlap 4 to simulate the human earlap in shape and dimensions, and an ear pad 5. Since the right and left units are identical in construction except for the direction of the artificial earlaps, the description will proceed in connection with the left-ear unit 1L.

Figure 2:
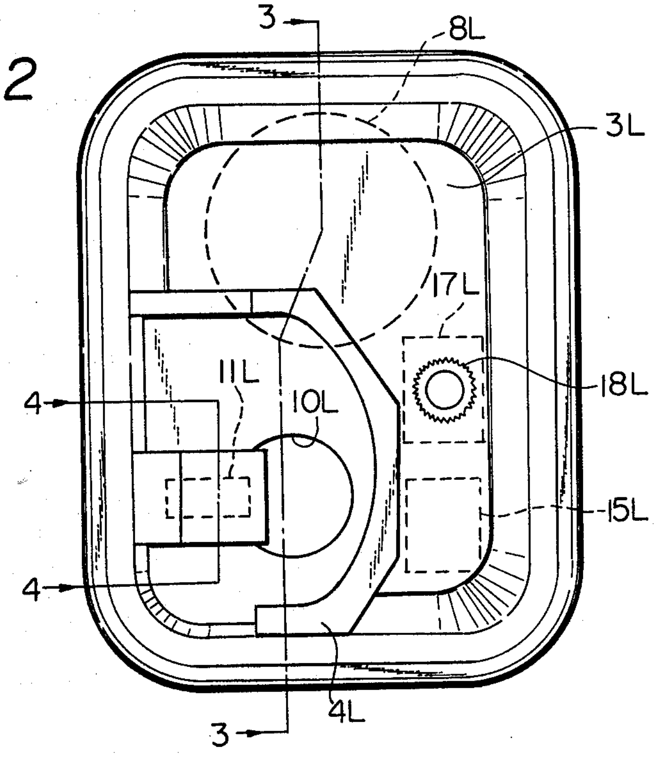
FIG. 2 is an end view of a left-ear transducer unit of the headphone of FIG. 1.
Figure 3:
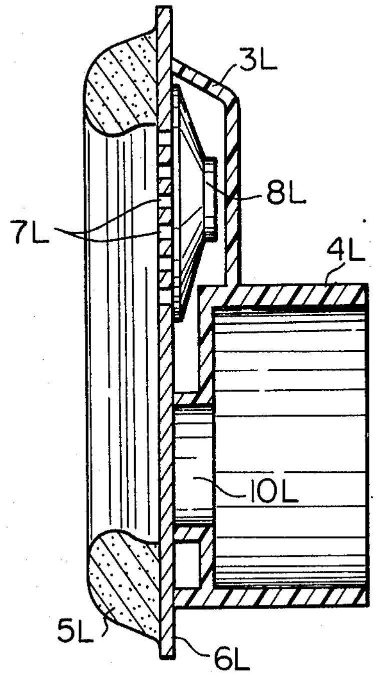
FIG. 3 is a cross-sectional view taken along section line 3—3 of FIG. 2.
Figure 4:
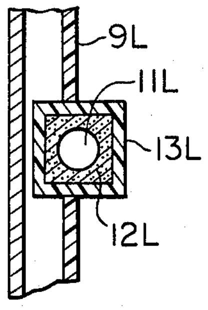
FIG. 4 is a cross-sectional view taken along section line 4—4 of FIG. 2.

As illustrated in FIGS. 2 and 3, the left-ear unit 1L includes a baffle plate 6L formed with a plurality of apertures 7L, a loudspeaker 8L mounted on the apertured portion of the baffle plate 6L to transmit acoustic energy into a space enclosed by the annular ear pad 5L. The enclosure 3L encases the speaker 8L and is secured to the baffle plate 6L. The artificial earlap 4L is formed by a semicylindrical surfaced member which faces in a direction parallel to the orientation of the head of the listener when in use and is so curved to simulate the acoustic characteristics of the human earlap. As clearly seen in FIG. 5, the enclosure 3L is formed with a flat surface portion 9L which is defined by the surface of the semicylindrical surfaced member 4L and the peripheral edge of the enclosure 3L and parallel to the baffle plate 6L. It is desirable that the surface portion 9L be positioned close to the baggle plate 6L, or wearer's ear in order to receive the true sound waves diffracted on the face of the wearer.

In the illustrated embodiment, therefore, the surface portion 9L is formed on a plane closer to the baffle plate 6L than the other portion of the housing 3L. The enclosure 3L is further formed with a cylindrical depression 10L on the surface 9L to simulate the structure of the human ear canal. Adjacent to the depression 10L is mounted a cylindrically shaped, non-directional electret-foil capacitor microphone 11L. The microphone 11L has a longitudinal dimension greater than the transverse dimension or diameter thereof with its main direction of acoustic sensitivity parallel to the longitudinal axis thereof, and is mounted with its longitudinal axis parallel to the baffle plate 6L and with its acoustoelectrical sensitivity being toward the artificial earlap 4L. The microphone 11L is supported within a roll of foam rubber 12L within a rectangular cover 13L which is open at one end toward the earlap 4L and closed at the opposite end which is shaped to provide a sloped portion 20L. The cover 13L is partly embedded into the surface 9L so that the microphone is also partly embedded under the plane of the surface 9L so as to receive the sound wave that has been reflected from the semicylindrical surface of the earlap 4L and propagated through the side and bottom walls of the cylindrical depression 10L.

With this arrangement, the sound collecting characteristic of the microphone unit 11L is closely analogous to that of the human ear structure. The foam rubber mounting of the microphone unit 11L serves to absorb the mechanical vibrations caused by handling of the headphone unit as well as the acoustic energy from the speaker 8L transmitted through the structural member of the enclosure 3L so as to prevent acoustic coupling between the speaker and microphone and electrical coupling through an amplifier to the speaker when the recorded sound is being monitored.

Figure 5:
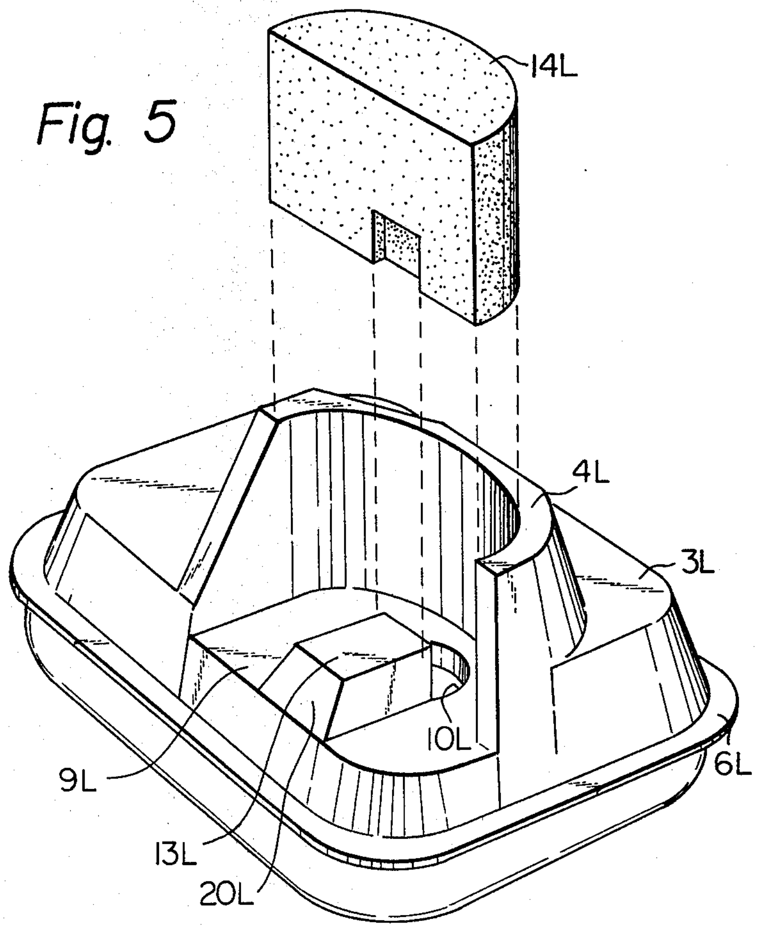
FIG. 5 is a perspective view of the transducer unit of FIG. 2 with a block of foam rubber shown detached from the transducer unit.

In FIG. 5, a block 14L of elastic foamed porous material, such as foam rubber or polyurethane foam is fitted into the semicylindrical surface of the earlap 4L and the surface 9L so that the sound wave may pass through the pores of the foam rubber to the microphone 11L. The effect of the foam rubber block 14L is to absorb the hissing sound produced by the wind passing the edge of the earlap 4L as will be experienced when outdoor recording is performed under strong windy condition. The block 14 is dimensioned slightly oversize the inner dimensions of the earlap 4 so as to be tightly fitted into position.

Figure 6:
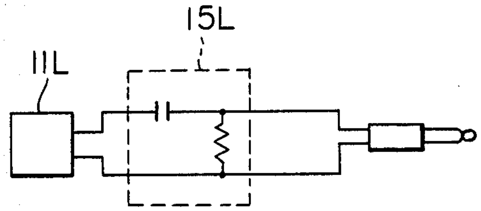
FIG. 6 is a circuit diagram for preventing undesirable acoustic coupling between the speaker and microphone.

If the headphone of the invention is not appropriately mounted on the wearer's head when the recorded sound is being monitored through the speakers 8, the acoustic energy from the speakers will escape through any gap which may be present between the ear pad 5 and the wearer's head and reach the microphones 11 so that both are acoustically coupled. This will cause howling which produces a sound at frequencies determined by the structure and material of the headphone unit. In order to prevent howling, a filter 15L is connected to the output of the microphone 11L as illustrated in FIG. 6. The filter 15L may be a low frequency attenuating type so that signals at frequencies lower than a predetermined frequency are attenuated if the howling produces a sound at frequencies lower than the cutoff frequency of the filter.

Figure 7:
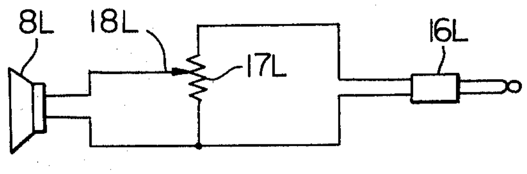
FIG. 7 is a circuit diagram for controlling the level of signals applied to the loudspeaker independently of the adjustment of the reproduced sound on a tape recording apparatus to prevent howling.

When recorded sound is being monitored through the speakers 8 using a tape recorder (not shown), the amplitude of the signal applied to the speakers is determined by the gain control adjustment provided at the tape recorder. Therefore, it is likely that the maximum gain will result in a strong acoustical energy which, when received by the microphones, will generate howling. FIG. 7 illustrates a level control circuit to prevent howling under the afore-mentioned condition by permitting the user to independently adjust the sound level of the speakers 8. A plug 16L which is adapted to be connected to the sound output terminal (not shown) of the tape recorder is connected through a variable resistor or potentiometer 17L to the input to speaker 8L. The potentiometer is mounted in the enclosure 3L as shown in FIG. 2 with the adjustment knob 18 located on the external wall of the housing so as to be accessible by the user's hand.

What is claimed is:

1. Apparatus having a pair of baffle plates, a pair of loudspeakers each mounted on a respective baffle plate and a pair of enclosures, each loudspeaker encased within a respective enclosure, a strap interconnecting the enclosures for holding the loudspeakers in positions adjacent to the ears of a wearer, the improvement wherein each of said enclosures is formed with a portion having a generally semicylindrical surface to simulate a human earlap in shape and dimensions, a flat surface parallel to said baffle plate remote from the ear of said wearer and defined by the semicylindrical surface and the peripheral edge of said enclosure and normal to the semicylindrical surface, and a depression in said flat surface to simulate a human ear canal, and a microphone mounted on said flat surface adjacent to said depression.

2. Apparatus as claimed in claim 1, wherein said microphone has a longitudinal dimension greater than the transverse dimension thereof and the main direction of acoustic sensitivity is parallel to a longitudinal axis thereof, and wherein the longitudinal axis is parallel to said flat surface.

3. Apparatus as claimed in claim 2, wherein said main direction of acoustic sensitivity is toward said portion having a semicylindrical surface.

4. Apparatus as claimed in claim 3, including a cover wherein said microphone is mounted within and having one end open toward said portion having a semicylindrical surface and an opposite end being closed.

5. Apparatus as claimed in claim 4, including a shock absorbing material supporting said microphone.

6. Apparatus as claimed in claim 5, wherein said microphone is partly embedded into said flat surface.

7. Apparatus as claimed in claim 1, further comprising a block of elastic foamed porous material fitted to said portion having said semicylindrical surface portion and said flat surface so that acoustic energy may be transmitted to said microphone through pores of said porous material.

8. Apparatus as claimed in claim 1, further comprising a filter circuit connected to the output of said microphone to attenuate a signal at frequencies which correspond to the frequencies of a howling which will occur when said speaker and microphone are acoustically coupled to each other.

9. Apparatus as claimed in claim 8, wherein said filter circuit is a low frequency attenuating filter.

10. Apparatus as claimed in claim 8, wherein said filter circuit is mounted in said enclosure.

11. Apparatus as claimed in claim 1, further comprising means connected to the input to said speaker for adjusting the amplitude of a signal applied thereto.

12. Apparatus as claimed in claim 11, wherein said adjusting means is a potentiometer.

* * * * *